US008052191B2

(12) United States Patent
Shea

(10) Patent No.: US 8,052,191 B2
(45) Date of Patent: Nov. 8, 2011

(54) HINGED VAPOR WALL

(75) Inventor: Daniel G. Shea, Granger, IN (US)

(73) Assignee: Gulf Stream Coach, Inc., Nappanee, IN (US)

( * ) Notice: Subject to any disclaimer, the term of this patent is extended or adjusted under 35 U.S.C. 154(b) by 163 days.

(21) Appl. No.: 12/506,348

(22) Filed: Jul. 21, 2009

(65) Prior Publication Data

US 2011/0016799 A1 Jan. 27, 2011

(51) Int. Cl.
*B60J 7/00* (2006.01)
*E06B 7/16* (2006.01)

(52) U.S. Cl. ..................... 296/24.43; 49/368; 296/24.41

(58) Field of Classification Search ................. 296/24.4, 296/24.41, 24.43; 49/368
See application file for complete search history.

(56) References Cited

U.S. PATENT DOCUMENTS

| | | | | |
|---|---|---|---|---|
| 3,370,877 | A * | 2/1968 | Hallberg | 292/285 |
| 4,052,819 | A * | 10/1977 | Beischel et al. | 49/368 |
| 6,158,171 | A * | 12/2000 | Kellogg et al. | 49/489.1 |
| 7,909,379 | B2 * | 3/2011 | Winget et al. | 296/24.43 |

* cited by examiner

*Primary Examiner* — Joseph Pape
(74) *Attorney, Agent, or Firm* — Botkin & Hall, LLP

(57) ABSTRACT

A hinged vapor wall for use in mobile living quarters having a main living area and a secondary area such as a garage. The vapor wall has a first and second section that overlap to form a barrier between the garage and the main living area. When the sections of the vapor wall are in their closed position, the main living area and the garage area are divided into separate airtight compartments. Typically, small vehicles such as motorcycles and ATVs are placed in the garage, and the fumes from their fuel may spread into the main living space in the absence of a barrier. A permanent barrier sacrifices space within the main living area. The hinged vapor wall of this invention is movable to an open position when small vehicles are not being stored in the garage, enabling the garage to be used as living space as well.

20 Claims, 7 Drawing Sheets

FIG. 8
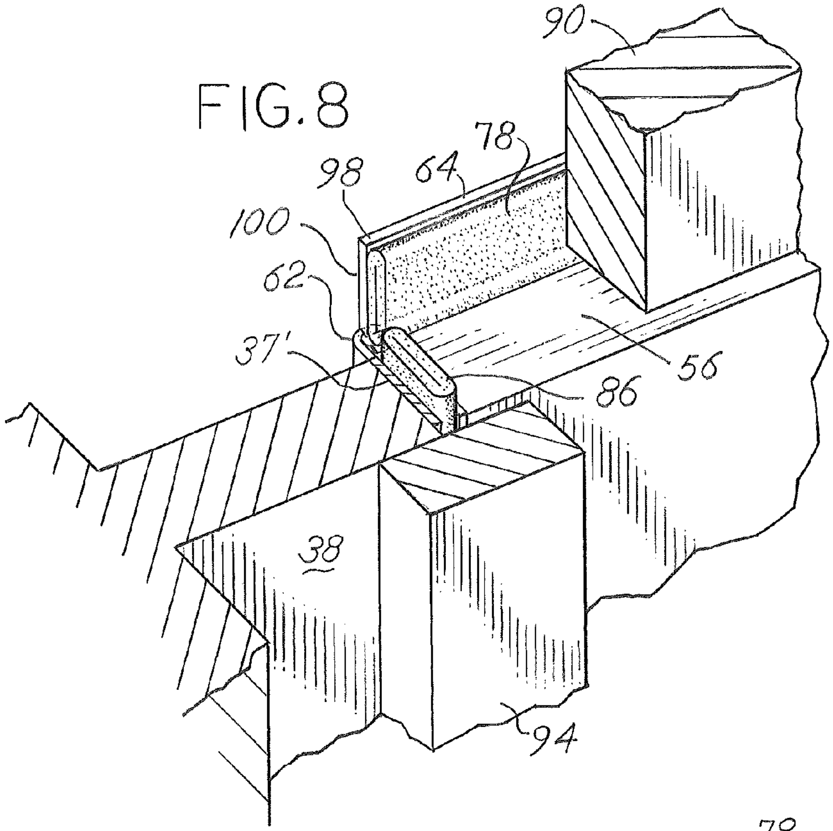
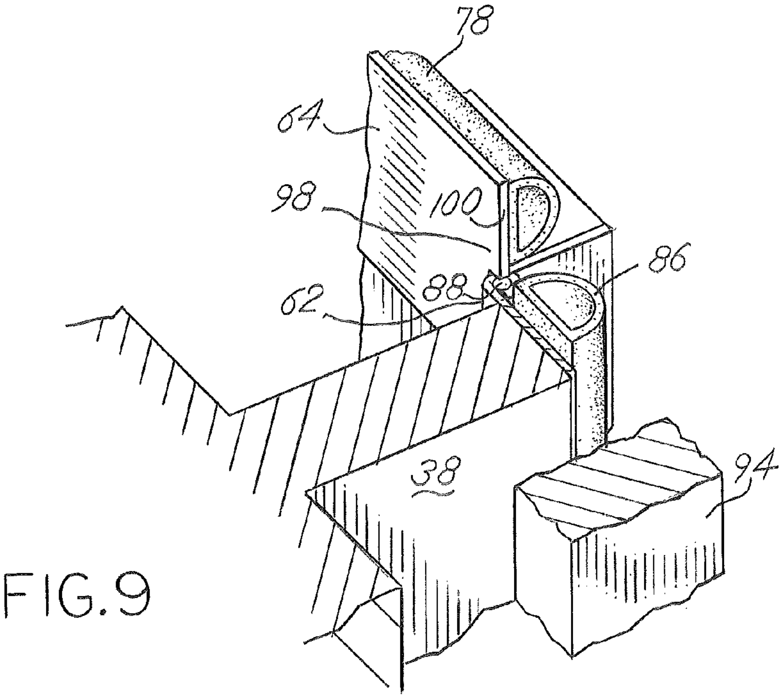
FIG. 9

FIG. 12
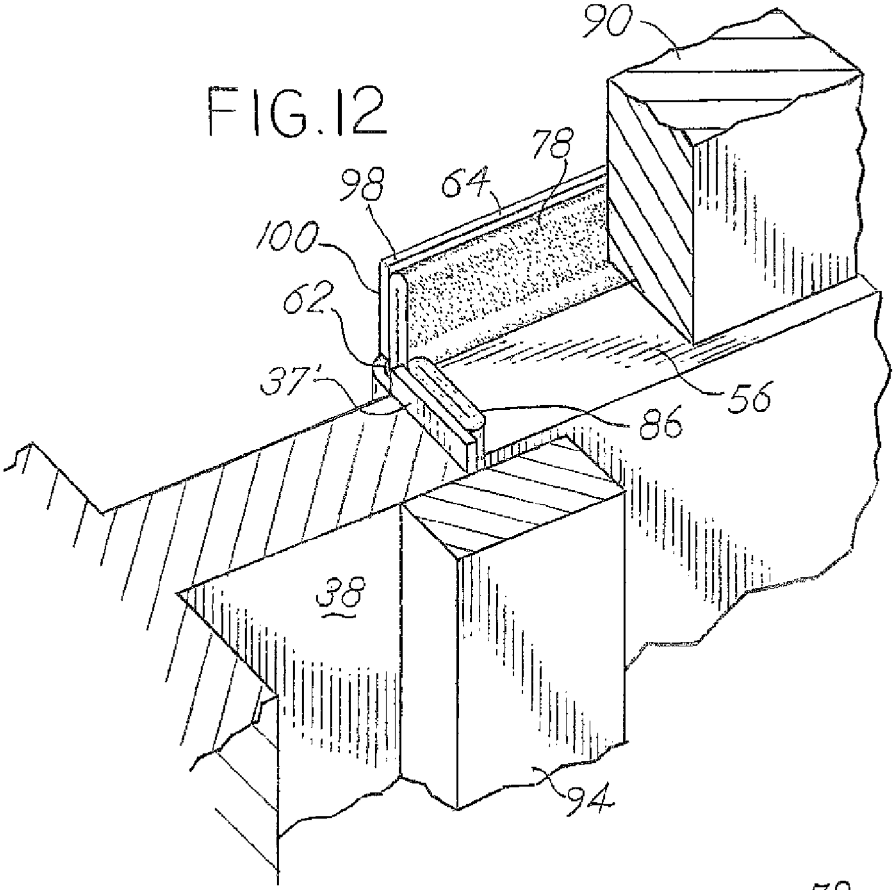
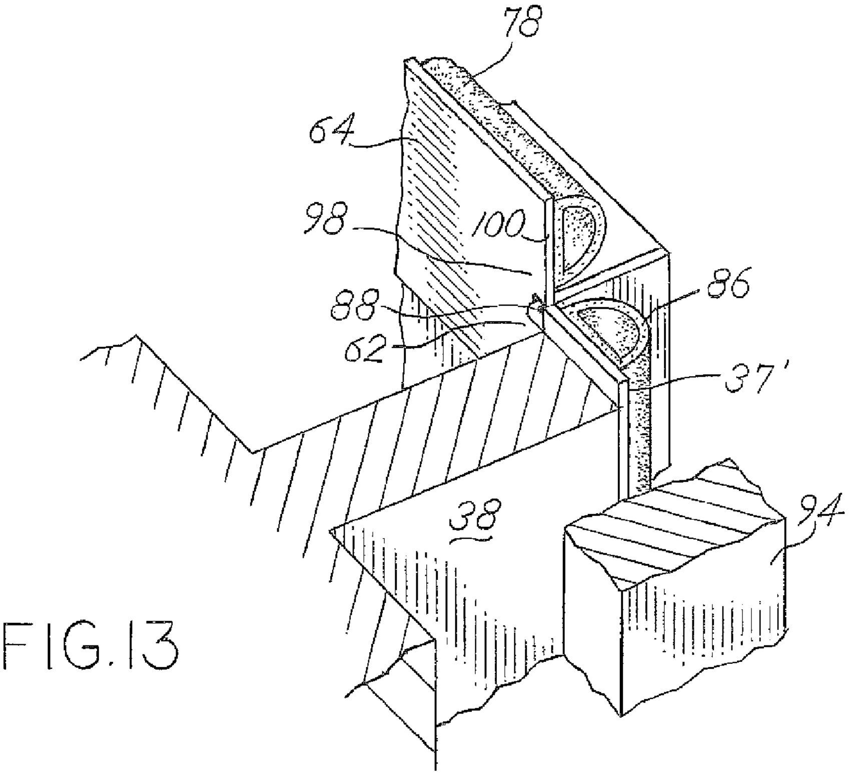
FIG. 13

HINGED VAPOR WALL

BACKGROUND OF THE INVENTION

Modern toy haulers provide many of the same amenities of a fixed home, but have the added benefit of being portable. In an effort to make a toy hauler feel as much like a traditional home as possible, features such as slide-out rooms and garages have been added. Slide-out rooms are used to maximize the available interior space when parked. However, a separate garage can subtract from overall living space if a fixed wall is placed between the garage and the main living area.

A fixed wall garage has been necessary in prior art designs because of the fumes from fuel carried in vehicles within the garage. Vehicles or toys, which are usually motorcycles or ATVs, may contain several gallons of gasoline per vehicle. Since gasoline is extremely volatile, the vapors would easily migrate into living space unless a fixed wall is placed between the garage and living area. Having a fixed wall is objectionable to most customers because that would mean losing twelve feet of living space from the end of the toy hauler. Ideally, a garage wall would have a position that separates the living area from the garage while blocking all vapors and the wall would be movable to extend the living area into the garage when it is empty.

SUMMARY OF THE INVENTION

The hinged vapor wall of this invention is for use in mobile living quarters having a main living area and a secondary area such as a garage. The vapor wall includes a first section having a first major surface that faces the main living area and a second major surface that is substantially parallel to the first major surface and faces the secondary area. A transverse surface extends between the first and second major surfaces to define an edge surface. The edge surface has an upper portion, a lower portion, a hinged portion, and an unhinged portion. A first hinge is located adjacent to the hinged portion of the edge surface of the first section to connect the first section to a wall of the mobile living quarters. The first hinge facilitates movement of the first section between an open and closed position. A first flange extends from one of the major surfaces and adjacent to the upper, lower, and unhinged portions of the edge surface. A first seal is adjacent to the first flange and a hinge seal is adjacent to the hinge.

A second section has a first major surface facing the main living area and a second major surface substantially parallel to the first major surface and facing the secondary area. A transverse surface extends between the first and second major surfaces to define an edge surface. The edge surface has an upper portion, a lower portion, and a hinged portion. A second hinge is located adjacent to the hinged portion of the edge surface and connects the second section to a wall of the mobile living quarters. The second hinge facilitates movement of the second section between an open and closed position. A second and third flange extends from a corresponding major surface to that of the first section. The second flange is adjacent to the upper portion of the edge surface and the third flange is adjacent to the lower portion of the edge surface. Flange seals are adjacent to the second and third flanges. A hinge seal is adjacent to the hinge. The flange seals and hinge seals are compressed when the first and second sections are in their closed positions.

In an aspect of the invention, when the sections are in their closed positions, the flange seals are compressed against the hinge seals.

In another aspect of the invention, the hinges include mounting flaps that have mechanical fasteners extending through the flaps. One flap of each hinge is affixed to a wall of the mobile living quarters and another flap is affixed to a hinged portion of the edge surface of a corresponding section. The hinge seal is located between the mechanical fasteners and the pivot point of the hinge.

In another aspect of the invention, the first flange overlaps the second section when the sections are in their closed position

BRIEF DESCRIPTION OF THE DRAWINGS

FIG. 8 is a perspective view of the second section of the vapor wall as viewed from inside the main living area showing the relationship of the flange seal and the hinge seal when the second section is in its closed position with the flange cut away to show the flange seal;

FIG. 9 is a perspective view as shown in FIG. 8, with the second section in its opened position with the flange cut away to show the flange seal;

FIG. 12 is a perspective view of the second section of the vapor wall as viewed from inside the main living area showing the relationship of the flange seal and the hinge seal when the second section is in its closed position; and FIG. 13 is a perspective view as shown in FIG. 12, with the second section in its opened position.

DETAILED DESCRIPTION OF INVENTION

Figure 1:
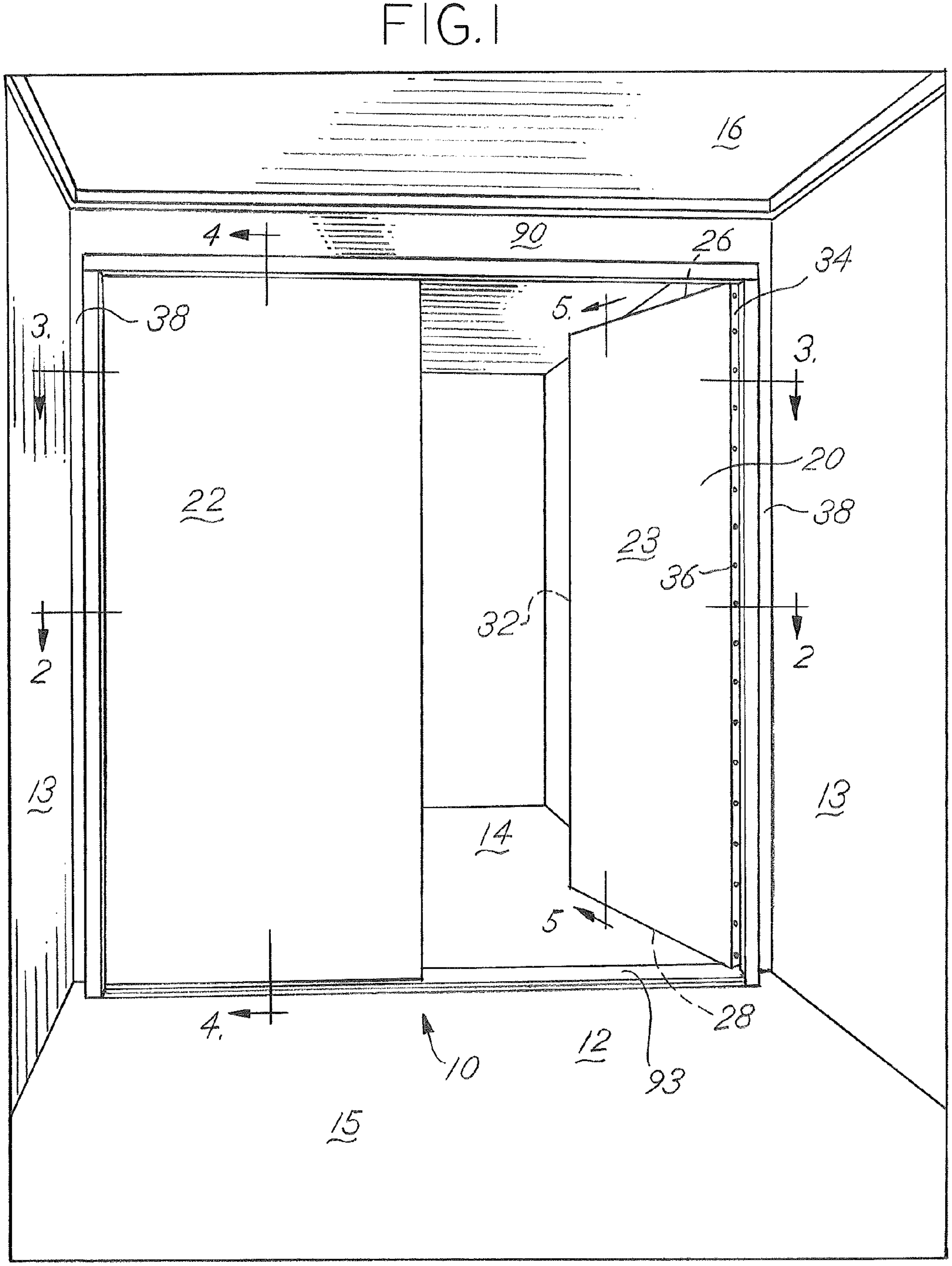
FIG. 1 is a perspective view of the hinged vapor wall as viewed from the main living area.
Figure 2:
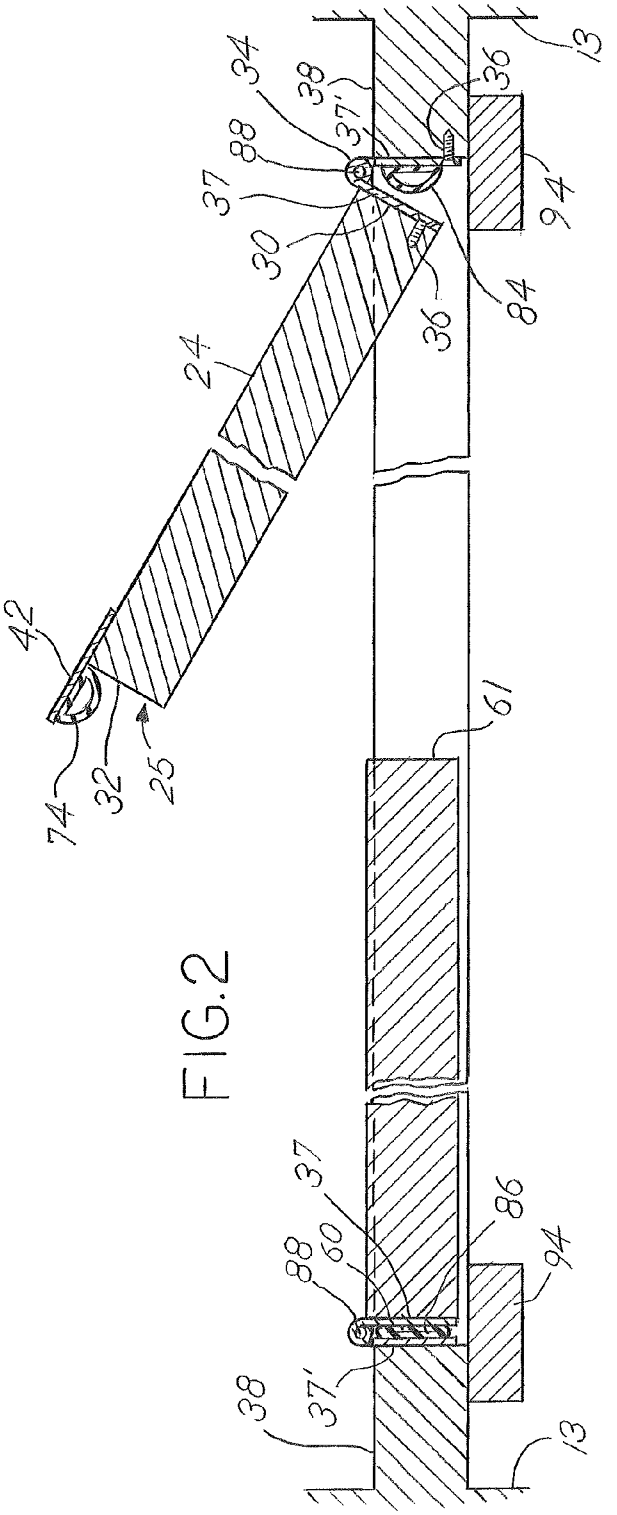
FIG. 2 is a sectional view taken about the line 2-2 in FIG. 1.

The hinged vapor wall 10 of this invention is placed in a toy hauler, which is often a fifth wheel trailer, but may be another type of mobile recreational vehicle. The vehicle is a mobile living quarters that has a main living area 12 and a secondary area 14 that is typically a garage for storing toys such as ATVs or motorcycles. The interior of the mobile living quarters is defined by walls 13, a floor 15, and a ceiling 16. The vapor wall 10 includes a first section 20 and a second section 22. The first section 20 has a first major surface 23 that faces the main living area 12 and a second major surface 24 substantially parallel to the first major surface 23 and faces the secondary area 14. A transverse surface 25 extends between the first and second major surfaces to define an edge surface that has an upper portion 26, a lower portion 28, a hinged portion 30, and an unhinged portion 32. A first hinge 34 is affixed to the first section 20 and a wall 13 of the toy hauler as shown in FIG. 1. Screws 36 driven through the hinge flaps 37 attach file hinge 34 to the hinged portion 30 and the wall 13 as shown in FIG. 2. In the configuration shown in FIG. 1, a short wall section 38 extends from the walls 13 and the hinge is attached to the wall section 38.

Figure 6:
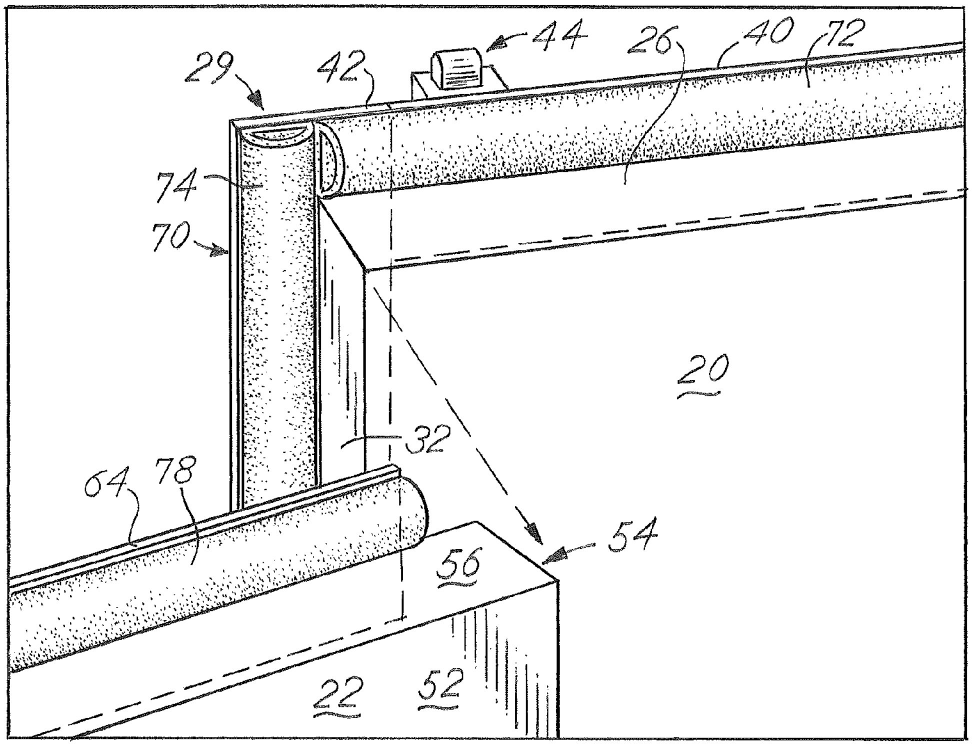
FIG. 6 is a perspective view of the first and second sections of the vapor wall shown in FIG. 1 in a position intermediate to their open and closed positions as viewed from inside the main living area.
Figure 7:
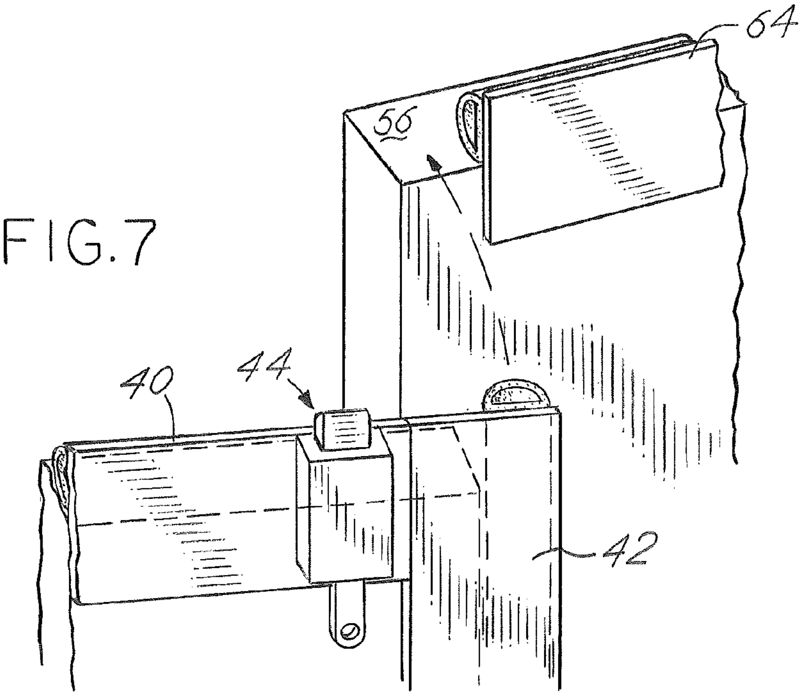
FIG. 7 is a perspective view similar to that of FIG. 6 as viewed from inside the secondary area.

A first flange 29 extends from the second major surface 24 adjacent to the upper portion 26, lower portion 28, and the unhinged portion 32. The first flange 29 extends around the periphery of the first section 20 with the exception of the hinged portion 30. The first flange 29 is made of individual metal strips 40, 42, 43. A top metal strip 40 extends adjacent to the upper portion 26 and a vertical metal strip 42 extends from the unhinged portion 32. FIG. 6 shows how the metal strips meet near an upper corner of the first section. A lower metal strip 43 extends from the first section 20 adjacent to its lower portion 28. The lower metal strip butts up against the vertical metal strip 42 in the same way as the top metal strip 40. A retractable latch 44 is affixed to the first section 20 near the upper portion 26 of the first section. Another latch 44 is also affixed to the first section 20 near its lower portion 28, opposite the latch near the upper portion 26. FIGS. 6 and 7 show the latch near the upper portion 26. Each latch 44 is designed to catch in a pocket located in the vehicle.

A second section 22 that is very similar to the first section 20 has a first major surface 50 that faces the main living area 12 and a second major surface 52 that faces the secondary area 54. The first major surface 50 and the second major surface 52 are substantially parallel. A transverse surface 54 extends between the first and second major surfaces 50, 52 to define an edge surface that has an upper portion 56, a lower portion 58, a hinged portion 60 and an unhinged portion 61. A second hinge 62 is mounted adjacent to the hinged portion 60 with screws 36 in the same way that the first section 20 is connected to the first hinge 34. The second section has a second flange 64 that is adjacent to the upper portion 56 and a third flange 66 that is located adjacent to the lower portion 28. Each of the flanges 64, 66 is made of a single strip of metal.

Seals are located on the first, second, third flanges 29, 64, 66. In the case of the first flange 29, the flange seal 70 is made of three separate seals 72, 74, 76 that are located on metal strips 40, 42, 43 respectively. Seal 78 is on the second flange 64, and seal 80 is on the third flange 66. A first hinge seal 84 is located on a flap 37' of the first hinge 34, and a second hinge seal 86 is located on a flap 37' of the second hinge 62. When the hinge seals 84, 86 are in their uncompressed state, they are located between the screws 36 and the pivot axis 88 of the hinges 34, 62, as shown in FIG. 2. All of the seals 72, 74, 76, 78, 80, 84, and 86 have a D-shaped cross section when uncompressed and are resilient.

Figure 3:
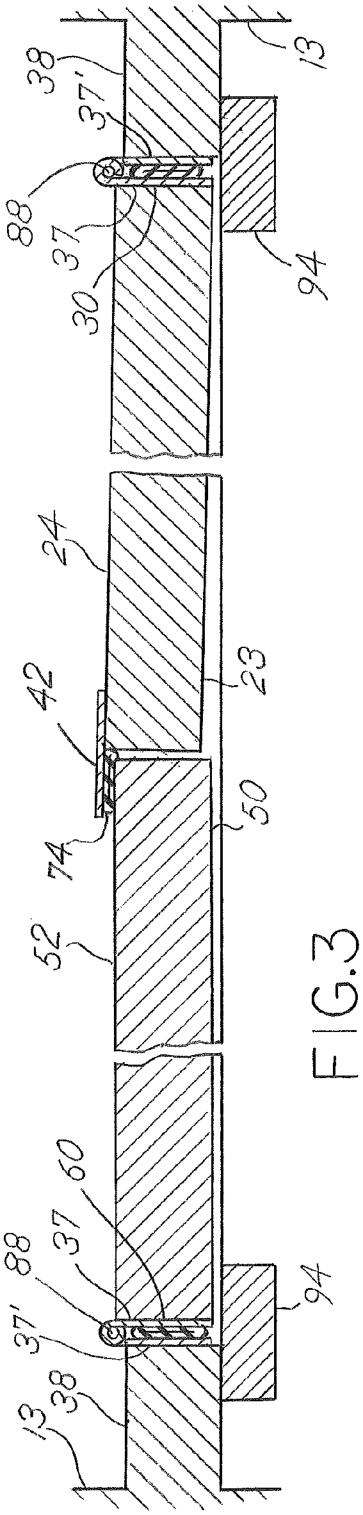
FIG. 3 is a sectional view taken about the line 3-3 in FIG. 1.
Figure 4:
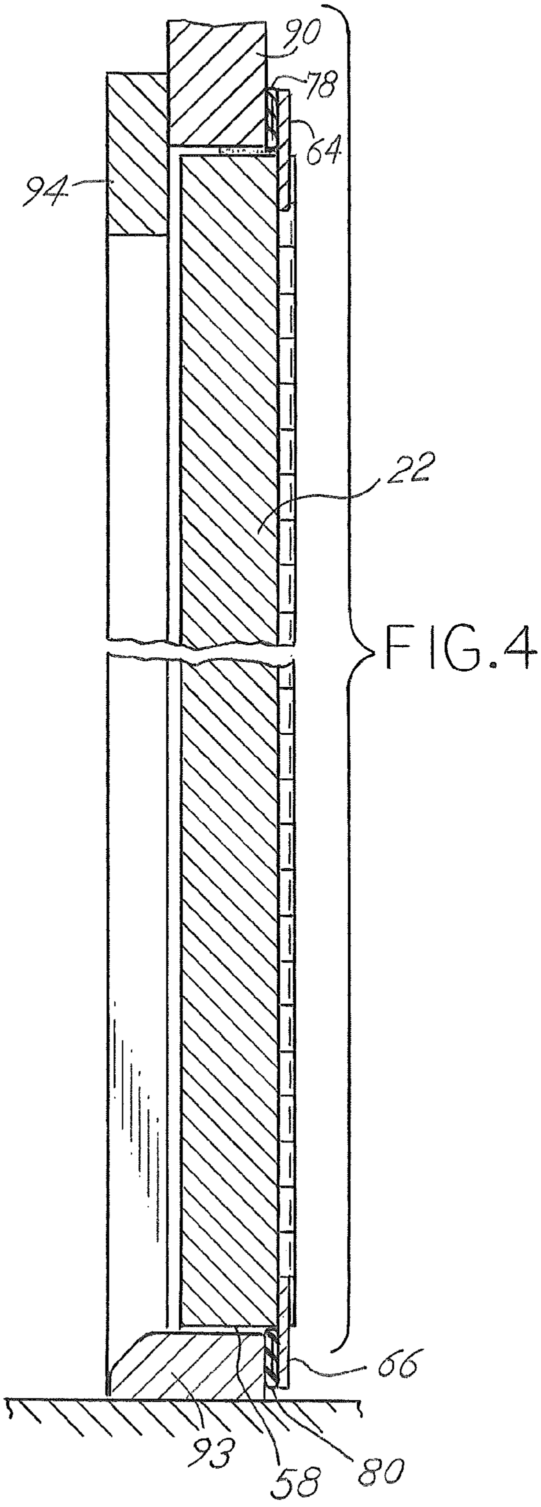
FIG. 4 is a sectional view taken about the line 4-4 in FIG. 1.
Figure 5:
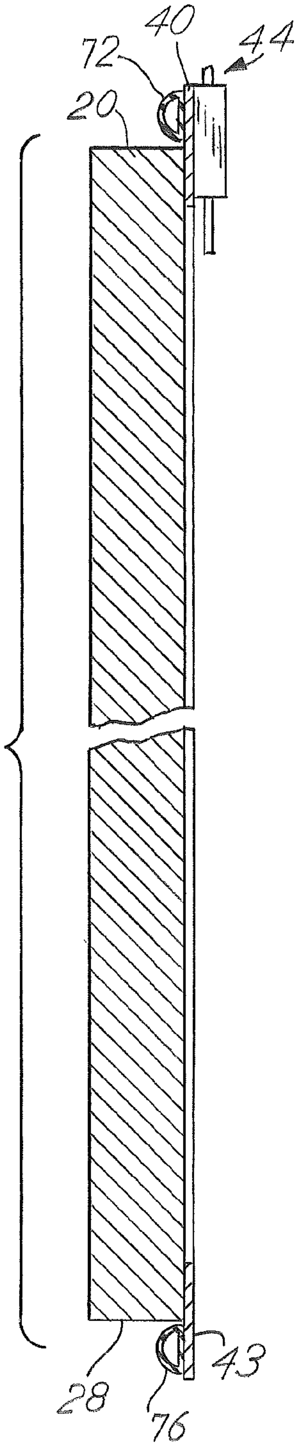
FIG. 5 is a sectional view taken about the line 5-5 in FIG. 1.

Each of the sections 20, 22 of the vapor wall 10 are bordered on their top by a header 90, on their bottom by a threshold 93. Trim pieces 94 conceal the gaps along the hinged portions 30, 60 and header 90. FIGS. 8 and 9 show the relationships of these parts in detail on the upper left corner of the second section. The hinges 34, 62 facilitate movement of the sections 20, 22 between a closed position shown in FIG. 8 and an open position shown in FIG. 9. When both of the sections 20, 22 are in their closed positions, the first flange 29 of the first section 20 overlaps the second section 22 along its unhinged portion 32. The closed position of both sections 20, 22 is shown in FIG. 3. When the sections 20, 22 are in this position, the latch will hold them both in their closed position.

Figure 10:
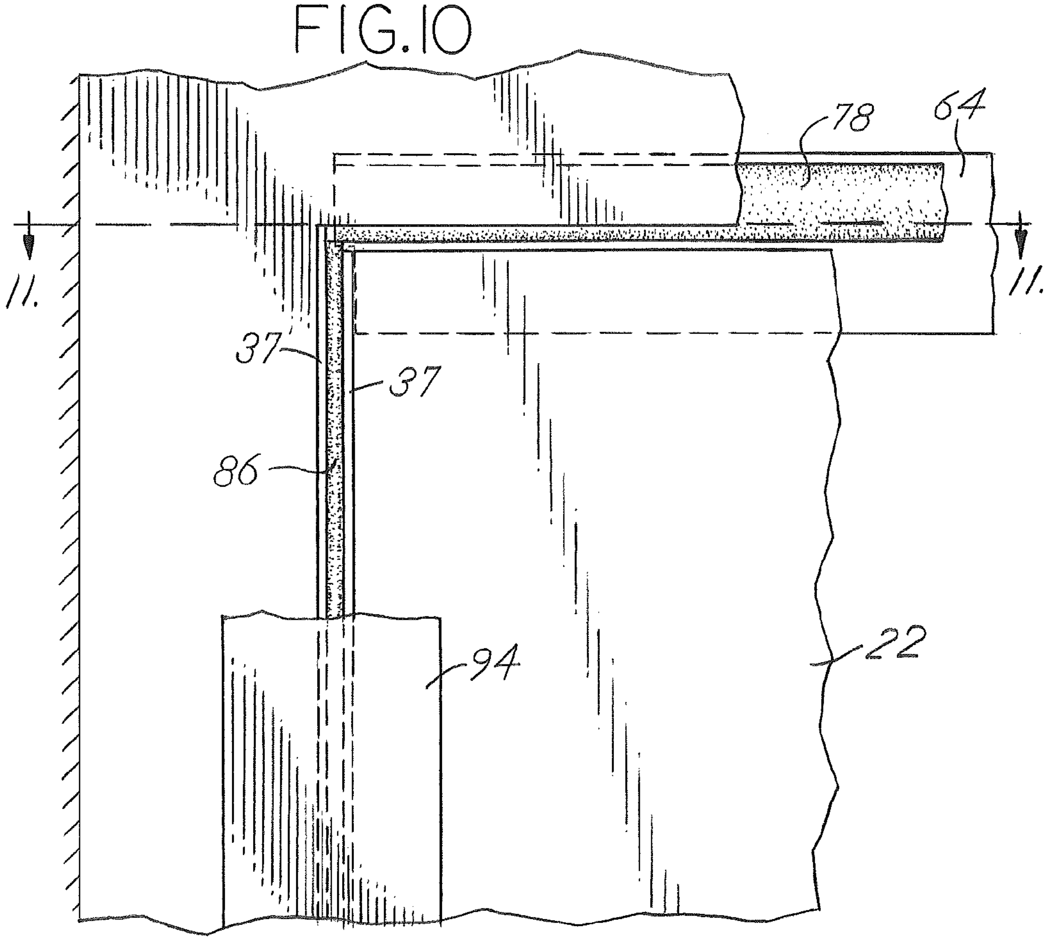
FIG. 10 is a view of the second section as viewed from inside the main living area with a portion of the trim removed.
Figure 11:
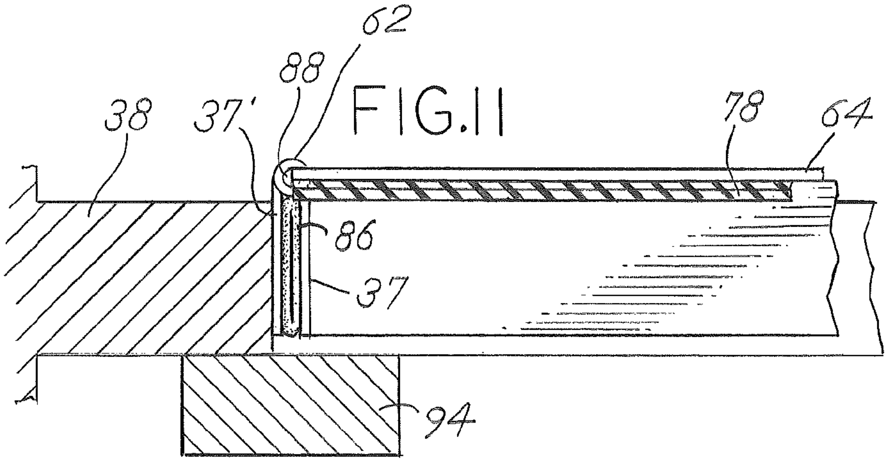
FIG. 11 is a sectional view taken about the line 11-11 in FIG. 10.

When the sections 20, 22 are in their open positions, the hinge seals 34, 86 and flange seals 72, 74, 76, 78, and 80 will have cross sections resembling those in FIG. 9. The metal strips 40, 43 of the first flange 29 and the flanges 64, 66 all have an extension 98 that extends beyond the hinged portion 30, 60 of their respective section 20, 22. The seals 72, 76, 78, and 80 on their respective flanges extend to the end of the end 100 of the extension 98. The extension 98 is typically chosen to be a length that reaches to at least the pivot axis 88 of each respective hinge 34, 62. The hinge flap 37, affixed to its respective hinged portion 30, 60 of a section 20, 22, is shorter than the hinge flap 37', affixed to the wall section 38. In FIGS. 8 and 9, the flap 37' is sectioned away for illustrative purposes. The flaps 37' extend up to the header 90 and down to the threshold 93. The flaps 37' provide a flat surface that supports the hinge seals 84, 86 continuously from the header 90 to the threshold 93. The flaps 37 that are affixed to the hinged portions 30, 60 are the length of their respective sections 20, 22. The sections 20, 22 are necessarily shorter than the distance from the header 90 to the threshold 93 to provide clearance. The clearance on the top of the second section 22 in the upper right corner as viewed from the main living area 12 is shown in FIG. 10.

When each section 20, 22 is closed, the hinged portions 30, 60 will resemble the configuration shown in FIG. 8, which shows a hinge seal 86 and flange seal 78 in their compressed state. When the seals 86, 78 are compressed, there will be an overlap between the hinge seal 86 and flange seal 78. This relationship is maintained in all of the corners of the sections adjacent to the hinged portions 30, 60. This overlap provides an air tight seal when the sections 20, 22 are closed. Additionally, the hinge seals 84, 86 will seal the hinges 34, 62 along their entire length. The flange seals 78, 72 adjacent to the upper portions 56, 26 will seal the tops of the sections 20, 22. The flange seals 76, 80 adjacent to the lower portions 28, 58 will seal the bottoms of the sections 20, 22. Seal 74 seals the gap formed between the sections 20, 22 when they are closed as shown in FIG. 3. The close relationship of the seals 72, 74, 78 that is shown in FIG. 6 provides an airtight seal where the flanges 64 and 29 meet when the seals 72, 74, and 78 are compressed. The relationship shown at the header in FIG. 6 also applies at the threshold 93. Thus the entire perimeter of both sections 20, 22 have an airtight seal when the sections 20, 22 are closed.

A user of a toy hauler will typically put ATV's or motorcycles in the garage 14 for storage during a trip. When vehicles are in the garage 14, the hinged vapor wall 10 will have both sections in their closed position. During transit, the vehicles in the garage 14 may emit fumes from their fuel tanks. The fumes will be contained within the garage area 14 when the vapor wall 10 is closed. When the vehicles are removed from the garage 14, that space may be converted to additional living space by unlatching the latches 44 and opening the sections against the walls 13 of the toy hauler. An additional feature that may be included in the vapor wall is a smaller door through which people may pass when the vapor wall 10 is closed. This smaller door must also have airtight seals to maintain the integrity of the vapor blocking properties of the vapor wall.

The invention is not limited to the description above, but may be modified within the scope of the following claims.

What is claimed is:

1. A hinged vapor wall for mobile living quarters having a main living area and a secondary area, said vapor wall comprising:

a first major surface facing said main living area;

a second major surface substantially parallel to said first major surface and facing said secondary area;

a transverse surface extending between said first and second major surfaces defining an edge surface having an upper portion, a lower portion, a hinged portion, and an unhinged portion;

a flange extending from one of said major surfaces adjacent to said upper or lower portion of said transverse surface and carrying a resilient flange seal adjacent to said transverse surface;

a hinge having a first flap and a second flap pivotally joined to said first flap, said first flap joined to said hinged portion of said transverse surface, said second flap joined to a wall of said mobile living quarters, said hinge facilitating movement of said vapor wall between an open and closed position, said second flap exceeding the length of said first flap, said second flap exceeding the length of said hinged portion of said transverse surface, wherein said second flap extends above said upper portion and below said lower portion of said transverse surface; and a hinge seal carried on said second flap, said hinge seal being substantially the same length as said second flap, said hinge seal exceeding the length of said hinged portion of said transverse surface, said hinge seal being compressed between said first flap and said second flap when said vapor wall is in its closed position, said flange seal being compressed between said flange and a header or threshold of said mobile living quarters when said vapor wall is in said closed position, said flange seal making sealed contact with said hinge seal when said vapor wall is in its closed position and said seals are compressed.

2. A hinged vapor wall as claimed in claim 1, wherein said flange extends from said first major surface at said upper portion, a lower flange extends from said first major surface at said lower portion and carries a lower flange seal, an unhinged flange extends from said first major surface at said unhinged portion and carries an unhinged flange seal.

3. A hinged vapor wall as claimed in claim 2, wherein said lower flange and said unhinged flange are substantially planar and parallel to said first major surface.

4. A hinged vapor wall as claimed in claim 3, wherein said lower flange seal makes sealed contact with said hinged flange seal and said unhinged flange seal when said vapor wall is in its closed position and said seals are compressed, said upper flange seal makes sealed contact with said unhinged flange seal when said vapor wall is in its closed position and said seals are compressed, and said unhinged flange seal is compressed against an ancillary surface of said mobile living quarters when said vapor wall is in its closed position.

5. A hinged vapor wall as claimed in claim 4, and the combination of said flange seal, said lower flange seal, said unhinged flange seal and said hinge seal form a vapor-tight seal between said living area and said secondary area when said vapor wall is in its closed position.

6. A hinged vapor wall as claimed in claim 5, wherein said ancillary surface is a wall of said mobile living quarters.

7. A hinged vapor wall as claimed in claim 5, wherein said ancillary surface is a major surface of a second hinged vapor wall.

8. A hinged vapor wall as claimed in claim 7, wherein the combination of said first hinged vapor wall and said second hinged vapor wall forms a vapor-tight seal between said living area and said secondary living area when both said first and second vapor walls are in said closed position.

9. A hinged vapor wall for mobile living quarters having a main living area and a secondary area, said vapor wall comprising:

a first section having a first living area major surface facing said main living area, a first secondary area major surface substantially parallel to said first living area major surface and facing said secondary area, a first transverse surface extending between said first living area major surface and said first secondary area major surface defining an edge surface having a first upper portion, a first lower portion, a first hinged portion, and a first unhinged portion, a first hinge having a first flap and a second flap pivotally joined to said first flap, said first hinge first flap joined to said first hinged portion of said first transverse surface, said first hinge second flap joined to a first wall of said mobile living quarters, said first hinge facilitating movement of said first section between an open and a closed position, said first hinge second flap exceeding the length of said first hinge first flap, said first hinge second flap extending the length of said first hinged portion of said first transverse surface, wherein said first hinge second flap extends above said first upper portion and below said first lower portion of said first transverse surface;

a first flange extending from one of said major surfaces of said first section adjacent to said first upper portion or first lower portion of said first transverse surface and carrying a resilient first flange seal adjacent to said transverse surface;

a first hinge seal carried on said first hinge second flap, said first hinge seal being substantially the same length as said first hinge second flap, said first hinge seal exceeding the length of said first hinged portion of said first transverse surface, said first hinge seal being compressed between said first hinge first flap and said first hinge second flap when said first section is in its closed position, said first flange seal making sealed contact with said first hinge seal when said first section is in its closed position and said seals are compressed;

a second section having a second living area major surface facing said main living area, a second secondary area major surface substantially parallel to said second living area major surface and facing said secondary area, a second transverse surface extending between said second living area major surface and said second secondary area major surface defining an edge surface having a second upper portion, a second lower portion, a second hinged portion, and a second unhinged portion, a second hinge having a first flap and a second flap pivotally joined to said first flap, said second hinge first flap joined to said second hinged portion of said second transverse surface, said second hinge second flap joined to a second wall of said mobile living quarters, said second hinge facilitating movement of said second section between an open and a closed position, said second hinge second flap exceeding the length of said second hinge first flap, said second hinge second flap extending the length of said second hinged portion of said second transverse surface, wherein said second hinge second flap extends above said second upper portion and below said second lower portion of said second transverse surface;

a second flange extending from one of said major surfaces of said second section adjacent to said second upper portion or second lower portion of said second transverse surface and carrying a resilient second flange seal adjacent to said second transverse surface;

a second hinge seal carried on said second hinge second flap, said second hinge seal being substantially the same length as said second hinge second flap, said second hinge seal exceeding the length of said second hinged portion of said second transverse surface, said second hinge seal being compressed between said second hinge first flap and said second hinge second flap when said second section is in its closed position, said second flange seal making sealed contact with said second hinge seal when said second section is in its closed position and said seals are compressed; and a connecting flange extends from a major surface of said first section and carries a connecting seal, said connecting flange is adjacent said first unhinged portion, said connecting seal contacts one of said major surfaces of said second section when said first and said second sections are in said closed positions, said connector flange seal making sealed contact with said first and said second flange seal when said first and said second sections are in said closed positions.

10. A hinged vapor wall as claimed in claim 9, wherein said first flange extends from said first living area major surface at said first upper portion and said second flange extends from said second living area major surface at said second upper portion, a first lower flange extends from said first living area major surface at said first lower portion and carries a first lower flange seal, and a second lower flange extends from said second living area major surface at said second lower portion and carries a second lower flange seal.

11. A hinged vapor wall as claimed in claim 10, wherein said first lower flange, said second lower flange and said unhinged flange are substantially planar and parallel to said first major surface.

12. A hinged vapor wall as claimed in claim 11, wherein said first lower flange seal makes sealed contact with said first hinged flange seal and said unhinged flange seal when said first section is in its closed position and said seals are compressed, wherein said second lower flange seal makes sealed contact with said second hinged flange seal when said second section is in its closed position and said seals are compressed.

13. A hinged vapor wall as claimed in claim 12, and the combination of said first and second flange seals, said first and second lower flange seals, said unhinged flange seal and said first and second hinge seals form a vapor-tight seal between said living area and said secondary area when said first and second sections are in said closed positions.

14. A hinged vapor wall for mobile living quarters having a main living area and a secondary area, said vapor wall comprising:

a first major surface facing said main living area;

a second major surface substantially parallel to said first major surface and facing said secondary area;

a transverse surface extending between said first and second major surfaces defining an edge surface having an upper portion, a lower portion, a hinged portion, and an unhinged portion;

a flange extending from one of said major surfaces adjacent to said upper or lower portion of said transverse surface and carrying a resilient flange seal adjacent to said transverse surface;

a hinge facilitating movement of said vapor wall between an open and closed position, said hinge pivotally joining said vapor wall to a wall of said mobile living quarters, said wall of said mobile living quarters having a length greater than said hinged portion of said vapor wall and extending above and below said hinged portion, said wall extending between a header and a threshold of said mobile living quarters; and a hinge seal carried on said wall of said mobile living quarters, said hinge seal exceeding the length of said hinged portion of said transverse surface, said hinge seal being compressed between said wall of said mobile living quarters and said hinged portion of said transverse surface when said vapor wall is in its closed position, said flange seal being compressed between said flange and said header or threshold of said mobile living quarters when said vapor wall is in said closed position, said flange seal making sealed contact with said hinge seal when said vapor wall is in its closed position and said seals are compressed.

15. A hinged vapor wall as claimed in claim 14, wherein said flange extends from said first major surface at said upper portion, a lower flange extends from said first major surface at said lower portion and carries a lower flange seal, an unhinged flange extends from said first major surface at said unhinged portion and carries an unhinged flange seal.

16. A hinged vapor wall as claimed in claim 15, wherein said lower flange seal makes sealed contact with said hinged flange seal and said unhinged flange seal when said vapor wall is in its closed position and said seals are compressed, said upper flange seal makes sealed contact with said unhinged flange seal when said vapor wall is in its closed position and said seals are compressed, and said unhinged flange seal is compressed against an ancillary surface of said mobile living quarters when said vapor wall is in its closed position.

17. A hinged vapor wall as claimed in claim 16, and the combination of said flange seal, said lower flange seal, said unhinged flange seal and said hinge seal form a vapor-tight seal between said living area and said secondary area when said vapor wall is in its closed position.

18. A hinged vapor wall as claimed in claim 17, wherein said ancillary surface is a wall of said mobile living quarters.

19. A hinged vapor wall as claimed in claim 17, wherein said ancillary surface is a major surface of a second hinged vapor wall.

20. A hinged vapor wall as claimed in claim 19, wherein the combination of said first hinged vapor wall and said second hinged vapor wall forms a vapor-tight seal between said living area and said secondary living area when both said first and second vapor walls are in said closed position.

* * * * *